United States Patent
Lynch et al.

(10) Patent No.: US 11,021,551 B2
(45) Date of Patent: Jun. 1, 2021

(54) TRI-N-OCTYL ALUMINUM CO-CATALYST FOR HIGHER DENSITY HOMOPOLYMERS FOR THE SOLUTION PROCESS

(71) Applicant: EQUISTAR CHEMICALS, LP, Houston, TX (US)

(72) Inventors: Michael W. Lynch, West Chester, OH (US); D. Ryan Breese, Loveland, OH (US); Thomas J. Schwab, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 16/053,380

(22) Filed: Aug. 2, 2018

(65) Prior Publication Data
US 2019/0040162 A1 Feb. 7, 2019

Related U.S. Application Data

(60) Provisional application No. 62/540,193, filed on Aug. 2, 2017.

(51) Int. Cl.
*C08F 10/02* (2006.01)
*C08F 210/14* (2006.01)

(52) U.S. Cl.
CPC .................... *C08F 10/02* (2013.01)

(58) Field of Classification Search
CPC ............... C08F 210/14; C08F 10/02
See application file for complete search history.

(56) References Cited

U.S. PATENT DOCUMENTS 5,059,570 A * 10/1991 Bailly .................. C08F 210/16
502/104
6,127,484 A * 10/2000 Cribbs .................. C08L 23/04
525/191

* cited by examiner

*Primary Examiner* — Catherine S Branch

(57) ABSTRACT

Catalyst systems and solution olefin polymerization processes using a combination of titanium compounds (e.g. halides) with vanadium compounds (e.g. halides or oxyhalides) with tri-n-octyl aluminum (TNOAL) as a co-catalyst, which provides lower in situ oligomerization of olefins that are incorporated into the homopolymer. This feature provides a higher density homopolymer using TNOAL, which enhances polymer properties such as increased moisture barrier and stiffness. Multi-reactor systems and solution olefin polymerization processes comprising this catalyst system.

19 Claims, 2 Drawing Sheets

TRI-N-OCTYL ALUMINUM CO-CATALYST FOR HIGHER DENSITY HOMOPOLYMERS FOR THE SOLUTION PROCESS

CROSS REFERENCE TO RELATED APPLICATIONS

This application is the Non-Provisional patent application, which claims benefit of priority to U.S. Provisional Application No. 62/540,193, filed Aug. 2, 2017, the contents of which are incorporated herein by reference in their entirety.

TECHNICAL FIELD

This disclosure relates to Ziegler-Natta type catalyst systems for polymerizing ethylene, their use in solution polymerizations, and the resulting polyethylene produced therefrom.

BACKGROUND OF THE INVENTION

Polyethylene production using Ziegler-Natta catalysts has been an important process for decades, and it continues to be at the center of polyolefin manufacture. Ziegler-Natta processes can use early transition metal catalysts such as titanium compounds, for example, titanium tetrachloride. Co-catalysts such as aluminum alkyl compounds such as triethyl aluminum or diethyl aluminum chloride, can be used. Combinations of titanium compounds with vanadium compounds have also been employed as Ziegler-Natta catalysts, for example, titanium tetrachloride with a vanadium chloride and a co-catalyst.

Solution polymerization processes are useful in polyolefin production, and may include both Ziegler-Natta and metallocene-type catalysts. In solution processes, the polyethylene is prepared in a hydrocarbon solution which may require high catalyst concentrations and/or high temperatures to be effective. Various reactor configurations can be used in solution processes, for example, single reactors, multiple reactors in parallel, or multiple reactors in series, or combinations of reactors in series and in parallel.

Despite advances in olefin polymerization catalysts and processes, there remains an ongoing need for improvements in catalyst efficiency, selectivity, thermal stability and the like. For example, solution process homopolymers often have lower density than homopolymers made by competitive slurry or gas phase processes. Therefore, there is a continuing need to improve solution processes to attain the desired polyethylene homopolymer or co-polymer properties.

SUMMARY OF THE INVENTION

Among other things, this disclosure provides a Ziegler-Natta type catalyst system and a solution olefin polymerization process using a combination of titanium compounds with vanadium compounds with tri-n-octyl aluminum (TNOAL) as a co-catalyst. This combination of catalyst and co-catalyst components has been discovered to unexpectedly result in lower in situ oligomerization of olefins as compared to conventional triethyl aluminum (TEAL). This lower in situ oligomerization leads to reduced incorporation of oligomers into the homopolymer through co-polymerization and a higher density homopolymer being produced with TNOAL as a co-catalyst as compared to TEAL.

In an aspect, the higher beginning homopolymer density provided by using TNOAL co-catalyst allows for increased octene incorporation in order to achieve the same high-density polyethylene (HDPE) co-polymer density. That is, a particular polymer density may be targeted in order to achieve the desired material stiffness. Increased octene incorporation at the same density provided by using TNOAL leads to improved drop impact and/or Environmental Stress Crack Resistance (ESCR). These results are demonstrated using a combination of a titanium chloride and a vanadium chloride or oxychloride, with tri-n-octyl aluminum (TNOAL) as a co-catalyst.

In an aspect, this disclosure provides a polymerization system and a process for polymerizing olefins, the process comprising:

a) contacting an olefin composition comprising ethylene with a catalyst system in a reactor, the catalyst system comprising a titanium halide, a vanadium halide, and tri-n-octyl aluminum co-catalyst; and b) forming a polyethylene under olefin polymerization conditions which provide a polyethylene homopolymer having a higher homopolymer density at equivalent homopolymer Melt Index (MI), as compared to a polyethylene homopolymer made under the olefin polymerization conditions with a reference catalyst system comprising the titanium halide, the vanadium halide, and triethyl aluminum co-catalyst.

According to another aspect, this disclosure provides for a multi-reactor solution polymerization process, the process comprising:

a) in a first reaction zone, contacting a first olefin composition comprising ethylene, optionally with a first catalyst system in a first parallel reactor under first olefin polymerization conditions, and forming a first polyethylene;

b) in the first reaction zone, contacting a second olefin composition comprising ethylene with a second catalyst system in a second parallel reactor under second olefin polymerization conditions, and forming a second polyethylene;

c) transferring the first polyethylene and the second polyethylene from the first reaction zone to a second reaction zone to continue or complete the polymerization;

wherein one or both of the first catalyst system and the second catalyst system comprise(s) a titanium halide, a vanadium halide, and tri-n-octyl aluminum co-catalyst; and wherein one or both of the first olefin polymerization conditions and the second olefin polymerization conditions provide a polyethylene homopolymer having a higher homopolymer density at equivalent homopolymer Melt Index (MI), as compared to a polyethylene homopolymer made under the olefin polymerization conditions with a reference catalyst system comprising the titanium halide, the vanadium halide, and triethyl aluminum co-catalyst.

In an aspect, the polymerization conditions and catalysts used in the first parallel reactor can be the same or can be different than those used in the second parallel reactor.

DETAILED DESCRIPTION OF THE INVENTION

Figure 1:
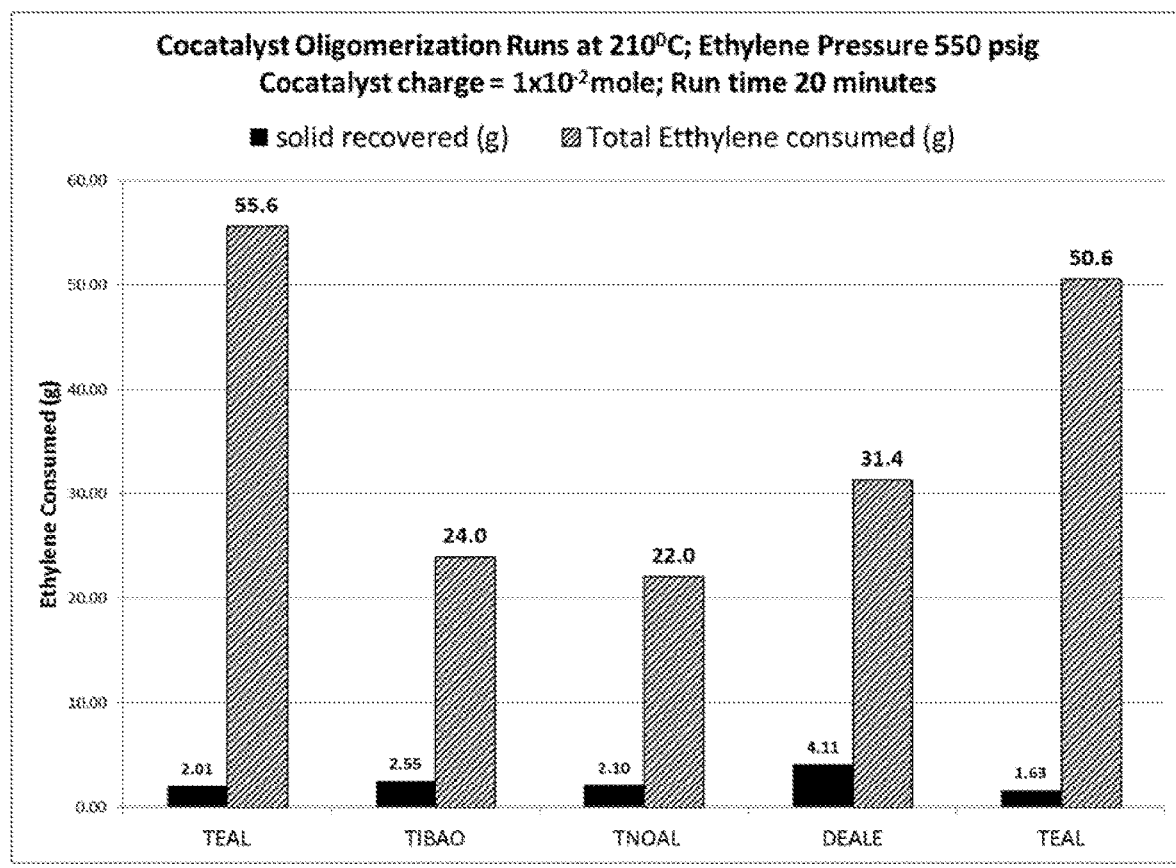
FIG. 1 depicts the amount of ethylene consumed for cocatalyst oligomerization runs.

Aspects of this disclosure provide for catalyst systems and solution olefin polymerization processes using a combination of titanium compounds (e.g. halides) with vanadium compounds (e.g. halides or oxyhalides) with tri-n-octyl aluminum (TNOAL) as a co-catalyst. Under high temperature conditions, this catalyst system unexpectedly provides a significantly lower in situ oligomerization of olefins as compared to the conventional triethyl aluminum (TEAL) co-catalysts using the same titanium and vanadium complexes. This feature, in turn, results in a higher density homopolymer using TNOAL due to less oligomer co-polymerization, which enhances polymer properties such as increased moisture barrier and stiffness.

Additionally, this higher initial homopolymer density using TNOAL allows for increased co-monomer (e.g. 1-octene) incorporation to achieve the same high-density polyethylene (HDPE) co-polymer density. Thus, increased 1-octene incorporation at the same target density leads to higher material stiffness, improved drop impact and/or enhanced Environmental Stress Crack Resistance (ESCR). This higher initial homopolymer density using TNOAL also allow can provide higher moisture vapor transmission rate in barrier films and lower stiffness in rigid parts made from these polyethylenes.

Particular applications for the HDPE resins include their use in flexible packaging for food which have lower moisture vapor transmission rates (MVTR), as well as medical and chemical goods to provide rigid molded parts with higher tensile and flexural stiffness. Lower MVTR films protect the packaged good and extend the shelf life. Higher stiffness rigid parts increase the load bearing performance of the part, allowing for stronger, lighter weight parts.

The term "solution process" means that the temperature and pressure in the reactor are high enough that the ethylene monomer, any α-olefin monomer, and any reaction solvent or carrier are primarily in a single fluid phase. The reactor temperature is kept above the melting point of the polyethylene product. Examples of solution processes can be found in, for example U.S. Pat. Nos. 3,218,266, 5,236,998, 6,127,484, 6,221,985, and 6,756,455, and include both Ziegler-Natta and metallocene-type catalysts, which are incorporated herein by reference. In solution processes, the polyethylene is prepared in a hydrocarbon solution which may require high catalyst concentrations and/or high temperatures to be effective. Various reactor configurations have been reported, for example, in U.S. Pat. No. 5,236,998 and U.S. Patent Publ. No. 2010/00113715 and include the use of multiple reactors in parallel, which are incorporated herein by reference.

The catalyst system is the term generally applied to the combination of components (transition metal catalyst and aluminum co-catalyst) and may be described by referring to the individual components that make up the system. For example, the catalyst system can be described as comprising a titanium halide, a vanadium halide, and tri-n-octyl aluminum co-catalyst, meaning that catalytic activity is obtained under polymerization conditions (temperature, ethylene pressure and the like) when these catalyst components are combined.

The catalyst system is generated by combining the catalyst components in a reaction medium, which can be an inert hydrocarbon medium, such as decahydronaphthalene, hexane(s), cyclohexane, benzene, and the like. Suitable solvents or carriers also include $C_5$ to $C_{12}$ hydrocarbon compounds or $C_6$ to $C_{12}$ hydrocarbon compounds, including saturated hydrocarbon compounds, isomers thereof including cyclic compounds, and mixtures of these hydrocarbon compounds. The term "solvent" is used herein to describe the liquid carrier, even if some portion of the catalyst system is not completely soluble therein. Heavy naphtha solvents such as ISOPAR™ work well as a hydrocarbon reaction medium in the catalyst processes disclosed here. The boiling point of the solvent is within the range of 30° C. to 170° C. and the boiling point can be in the range of 70° C. to 150° C. Solvents with lower boiling points can create excess pressure while solvents with higher boiling points can be difficult to remove at the end of the process.

The combination of catalyst components in the catalyst system can be carried out at any temperature, for example, within the range of 0° C. to 300° C., and the polymerization can be conducted, for instance, at temperatures greater than 140° C., any temperature within this range or even at lower or higher temperatures. For example, the catalyst components can be combined at 50° C. to 275° C., or 100° C. to 250° C. Similarly, the polymerization can be conducted at temperature conditions of 140° C. to 350° C., or 140° C. to 300° C., or 140° C. to 275° C. The temperature of the reactor or multiple reactors as described herein can be controlled by several methods such as by adjusting the temperature of the feed streams, ethylene concentration, or catalyst concentration.

The disclosed solution olefin polymerization process can be conducted at pressures (in Megapascal and atmospheres) from 0.5 MPa (4.9 atm) to 35 MPa (345 atm), or from 1 MPa (9.9 atm) to 30 MPa (296 atm), or from 2 MPa (20 atm) to 25 MPa (247 atm), or from 5 MPa (49 atm) to 20 MPa (197 atm). Higher or lower pressures can quite readily be employed.

Any quantity of catalyst (V and Ti compounds), co-catalyst (TNOAL), and liquid medium may be employed, and the rate of formation of product depends on the quantity of catalyst used. The co-catalyst can be used in excess and optionally in large excess. For example, the molar ratio of aluminum to the total moles of vanadium and titanium combined can be 1.5, 2, 3, 4, 5, 10, 15, 20, 30 or more. While not intending to be bound by theory, the co-catalyst is generally thought to function as a reducing agent and/or an alkylating agent and a sufficient excess of the co-catalyst is used to reduce at least a portion of the titanium and/or vanadium compound. In one aspect, the molar ratio of the TNOAL aluminum compound to combined transition metal compounds is within the range of 0.5:1 to 50:1, or from 1:1 to 5:1.

The process for polymerizing olefins disclosed herein comprises: a) contacting an olefin composition comprising ethylene and a catalyst system, the catalyst system comprising a titanium halide, a vanadium halide, and tri-n-octyl aluminum co-catalyst; and b) forming a polyethylene under olefin polymerization conditions, which are described above. The olefin composition can comprise ethylene, and the olefin composition can further comprise an α-olefin co-monomer. The olefin composition also can consist essentially of ethylene or can consist of ethylene, that is, the olefin composition that includes ethylene can be absent an α-olefin co-monomer. The polymerization conditions include, but are not limited to amounts (moles, weights) or relative amounts (molar or weight ratios) of catalyst, co-catalyst, $H_2$, $O_2$, co-monomer if used, solvent and the like. The polymerization conditions also include, but are not limited to amounts temperature, temperature ramps, pressure, run times, and the like.

The titanium halide can comprise or can be selected from a titanium trihalide or a titanium tetrahalide (particularly chloride, bromide or iodide), such as for example, $TiCl_3$ (titanium trichloride) or $TiCl_4$ (titanium tetrachloride). The titanium can be used in the form of the trihalide or tetrahalide, or other forms which are soluble or partially soluble in inert hydrocarbon solvents and/or are a precursor of a form which is soluble or partially soluble in inert hydrocarbon solvents. Other titanium halides may be employed, including those containing hydrocarbyl groups such as $Ti(OR)_n X_{4-n}$. (where X is chloride, bromide or iodide), including $Ti(OR)_n Cl_{4-n}$, where n is a number from 1 to 4, inclusive. In these formulas, R is a hydrocarbyl group, including an alkoxy group or an aryloxy group. Examples of hydrocarbyl groups include a $C_1$ to $C_{12}$ hydrocarbyl group, a $C_1$ to $C_8$ hydrocarbyl group, or a $C_1$ to $C_6$ hydrocarbyl group. Examples include methoxy, ethoxy, propoxy and butoxy groups. While alkoxy groups are commonly used, the R group in these formulas can also be an aromatic group. Further, compounds of the general formula $Ti(OR)_n Cl_{4-n}$, can have a combination of alkoxy, aryloxy, and halide groups.

The vanadium halide may be introduced in the form of vanadium tetrahalide (including chloride, bromide or iodide), such as for example, $VCl_4$ (vanadium tetrachloride). Other halides can be used such as $VOX_3$, including $VOCl_3$. For example, the vanadium can be used in the form of $VCl_4$ or other form which is soluble or partially soluble in inert hydrocarbon solvents and/or is a precursor of a form which is soluble or partially soluble in inert hydrocarbon solvents. Moreover, the vanadium may be introduced in any form which can produce a vanadium halide by metathesis, such as ammonium vanadate. For example, a suitable salt such as ammonium vanadate can be added to $TiCl_4$, prior to dissolving the latter in the hydrocarbon medium, to produce an effective catalyst mixture.

Additional examples of suitable titanium halides and vanadium halides are found in U.S. Pat. Nos. 3,218,266; 3,257,332; 4,250,288; and 4,371,455; and Canadian Patent No. 635,923, which are incorporated herein by reference. The molar ratio of vanadium halide to titanium halide can vary, for example, from 0.5:1 to 10:1, or from 1.5:1 to 6:1, or from or from 2:1 to 5:1. In embodiments, the molar ratio of vanadium halide to titanium halide can be from 1:1 to 10:1. In further embodiments, the quantity of vanadium is optionally greater than the quantity of the titanium (molar ratio or weight percentage).

The order of addition of the co-catalyst to transition metal compounds can be carried out in any number of ways. For example, the TNOAL can be added to a mixture of the transition metal halides, which generally provides improved results as compared to adding the mixture of halides to the TNOAL. In one aspect, the TNOAL can be added to a solution of the titanium halide, followed by the addition of the vanadium component. In another aspect, the vanadium component can be added before or after the addition of the titanium component. Alternatively, both the titanium and vanadium components are combined and the TNOAL is added to this mixture. In one aspect, separate streams or sources of transition metal halide and reducing agent can be united to produce the active catalyst. Regarding the introduction of ethylene, the combination of TNOAL with the titanium and/or vanadium components can be carried out prior to or before introducing the ethylene and/or co-monomer.

In one aspect, the polyethylene homopolymer or copolymer produced using the catalyst system and process disclosed herein can have a density of 0.942 g/cm³ to 0.965 g/cm³. Alternatively, the polyethylene homopolymer or copolymer can have a density of 0.940 g/cm³, 0.945 g/cm³, 0.950 g/cm³, 0.955 g/cm³, 0.960 g/cm³, 0.965 g/cm³, or 0.967 g/cm³, including any range between these density values. Polymer densities greater than 0.960 g/cm³ can also be prepared using the catalyst system and process disclosed herein.

In one aspect, the polyethylene homopolymer or copolymer produced using the catalyst system and process disclosed herein can have a melt index (MI) from 0.3 g/10 min to 100 g/10 min (ASTM D1238). Alternatively, the polyethylene homopolymer or copolymer may comprise a melt index (MI) from 0.5 g/10 min to 10 g/10 min, or from 1 g/10 min to 10 g/10 min. In addition, the polyethylene homopolymer or copolymer can have a melt index (MI) from 0.3 g/10 min to 70 g/10 min, from 0.5 g/10 min to 60 g/10 min, or from 1 g/10 min to 50 g/10 min (ASTM D1238). Alternatively, the polyethylene homopolymer or copolymer can have a melt index (MI) of 0.3 g/10 min, 0.5 g/10 min, 1.0 g/10 min, 1.5 g/10 min, 2 g/10 min, 4 g/10 min, 6 g/10 min, 8 g/10 min, 10 g/10 min, 12 g/10 min, 15 g/10 min, 20 g/10 min, 30 g/10 min, 40 g/10 min, 50 g/10 min, 60 g/10 min, 70 g/10 min, 80 g/10 min, or 100 g/10 min (as measured using ASTM D1238-13).

According to an aspect, the polyethylene homopolymer or copolymer produced using the catalyst system and process disclosed herein can have a polydispersity index ($M_w/M_n$) of from 3-15, such as 3.2 to 9.8. Alternatively, the polyethylene homopolymer or copolymer can have a polydispersity index ($M_w/M_n$) of 3, 4, 5, 6, 7, 8, 9, or 10, including any ranges between these density values.

In an aspect, the catalyst mileage can be obtained in the catalyst system and process disclosed herein. Catalyst mileage can be expressed as grams polyethylene/gram catalyst (g PE/g cat) under stated or comparative conditions. As the data from the examples illustrates, the catalyst systems using the TNOAL co-catalyst yielded a higher catalyst mileage (g PE/g cat) than the TEAL co-catalyst system, while providing similar polymer properties. The catalyst systems and processes using the TNOAL co-catalyst may yield a catalyst mileage that is at least 20% greater (e.g., about 22% greater) than the catalyst mileage (g PE/g cat) of the TEAL co-catalyst system, and the catalyst systems and processes disclosed herein may reduce the concentration of butene in a recycle stream by at least 50% (e.g., about 54%). For example, under the Example 2 co-polymerization conditions using 1-octene co-monomer, polymerization temperature of 140° C., a 4 mol $VOCl_3$ to 1 mol $TiCl_4$ catalyst combination, and a run time of 60 seconds, the catalyst mileage for TNOAL co-catalyst system can be from 1000 g PE/g cat to 1500 g PE/g cat, or from 1100 g PE/g cat to 1400 g PE/g cat, or from 1175 g PE/g cat to 1375 g PE/g cat. Under these conditions, co-polymer can be obtained with a melt index (MI) of from 9 g/10 min to 12 g/10 min. Alternatively, the melt index (MI) of the co-polymer can be from 9.5 g/10 min to 11.5 g/10 min. Melt index (or melt flow index) is determined according to ASTM D1238-13.

Under the Example 3 homo-polymerization conditions in the absence of a co-monomer, polymerization temperature of 240° C., a 4 mol $VOCl_3$ to 1 mol $TiCl_4$ catalyst combination, and a run time of 600 seconds, the catalyst mileage for TNOAL co-catalyst system can be from 1200 g PE/g cat to 1800 g PE/g cat, or from 1300 g PE/g cat to 1750 g PE/g cat, or from 1400 g PE/g cat to 1700 g PE/g cat. Under these conditions, homopolymer can be obtained with a melt index (MI) of from 10 g/10 min to 14 g/10 min. Alternatively, the melt index (MI) of the homopolymer can be from 11 g/10 min to 14 g/10 min.

The catalyst system and processes disclosed herein can be carried out in a single reactor or in a multi-reactor system. Examples of a multi-reactor solution process for polymerizing ethylene are disclosed in U.S. Pat. App. Pub. No. 2010/00113715, which is incorporated herein by reference. In some embodiments, the ethylene can be polymerized in a first reaction zone in two parallel reactors, and the polyethylene can be transferred to a second reaction zone to continue or complete the polymerization. In an aspect, the polymerization conditions and catalysts used in the first parallel reactor can be the same or can be different than those used in the second parallel reactor. When the conditions and catalysts in both parallel reactors are the same, both polymerization conditions are conditions that provide a polyethylene homopolymer having a higher homopolymer density at equivalent homopolymer Melt Index (MI), as compared to a polyethylene homopolymer made under the olefin polymerization conditions with a reference catalyst system comprising the titanium halide, the vanadium halide, and triethyl aluminum co-catalyst.

In other embodiments, the ethylene can be polymerized in a first reaction zone in two parallel reactors, in which the polymerization conditions and catalysts used in the first parallel reactor can be different than those used in the second parallel reactor. In this aspect, the catalysts in the first and second parallel reactors can be the same, but the other polymerization conditions can be different. In other aspects, the catalysts in the first and second parallel reactors can be the different, and the other polymerization conditions can be the same or different. For example in one aspect, ethylene can be contacted with a mixture of a titanium halide and a vanadium halide and optionally with a magnesium containing catalyst in the first parallel reactor, and with a magnesium-titanium based Ziegler-Natta catalyst at a lower temperature in the second parallel reactor. In another aspect of the multi-reactor system, when using different Ziegler-Natta type catalysts in this manner, the temperature in the second parallel reactor can be different than the temperature in the first parallel reactor. For example, the temperature in the second parallel reactor can be lower than the temperature in the first parallel reactor.

One example of Ziegler-Natta type catalysts that can be used in the multi-reactor systems that are different than the combination of a titanium halide and a vanadium halide and tri-n-octyl aluminum is a magnesium-titanium based Ziegler-Natta catalysts that can be prepared by the treatment of an alkyl magnesium compound with a titanium halide. For example, U.S. Pat. No. 5,589,555 describes using a catalyst prepared from titanium tetrachloride and dibutyl magnesium in a solution polymerization of ethylene. A highly active magnesium-titanium based catalyst also can be made from alkyl magnesium silylamides and titanium tetrachloride as set out in U.S. Pat. No. 4,499,198. Both of these U.S. patents are incorporated herein by reference.

Various reactor configurations can be used and the reactors can be any suitable equipment such as combinations of continuous stirred tank reactors (CSTRs) and/or tubular reactors. The last reaction zone can be a plug-flow tubular reactor (also called a "non-back-mixed" tubular reactor). The process can be a continuous process, in which the process comprises polymerizing ethylene in a first reaction zone (or "Zone 1") in two parallel reactors. Ethylene and any solvent can be fed into each of the two parallel reactors, then a catalyst can be fed to each of the two parallel reactors. The catalyst fed into each of the two parallel reactors can be the same or can be different, as described herein. The olefin composition comprising ethylene can be absent an α-olefin (1-olefin) comonomer or can further comprise α-olefin (1-olefin) comonomer.

When an α-olefin comonomer is fed to one or both of the parallel reactors, suitable α-olefins include or can be selected from, but are not limited to, propylene, 1-butene, 1-pentene, 1-hexene, 1-octene, 4-methyl-1-pentene, or combinations thereof. In one aspect, for example, when a magnesium-titanium based Ziegler-Natta catalysts is used in one of the parallel reactors, and when an α-olefin comonomer is employed, greater than 60% by weight of the α-olefin can be added to the second parallel reactor because the magnesium-titanium based catalyst is effective at comonomer incorporation. Additionally, greater than 75%, greater than 85%, or greater than 95% of the α-olefin can be added to the second parallel reactor under these circumstances.

In the two parallel reactor configuration, a mixture of a titanium halide and a vanadium halide as described herein can be fed to one or both of the first parallel reactor and the second parallel reactor. The titanium halide and vanadium halide can be premixed and fed to the first parallel reactor, or each halide can be fed to the first parallel reactor independently. The tri-n-octyl aluminum (TNOAL) can be added to the premixed titanium halide and vanadium halide, or the titanium halide and vanadium halide can be added to the reactor (first, second, or both) and the TNOAL co-catalyst can be added to the reactor separately from the titanium halide and vanadium halide. The temperatures of the multiple reactors can be controlled by, for example, adjusting the temperature of the feed streams, controlling the ethylene concentration, or adjusting the catalyst concentration. In an aspect, the temperature of the first parallel reactor can be from 140° C. to 255° C., or from 140° C. to 220° C.

The catalysts, conditions, and operation of the two parallel reactors can be the same, which is one standard operational mode, but if desired, the catalysts, conditions, and operation of the two parallel reactors can be different. As described herein, when a different second catalyst is added to the second parallel reactor, the second catalyst can comprise or be selected from a magnesium-titanium based Ziegler-Natta catalyst. These magnesium-titanium Ziegler-Natta catalysts have good activity at high temperatures, and can actually increase in activity as the reaction temperature is decreased. The second catalyst can be formed by contacting a titanium compound with a magnesium compound. The magnesium compound can be a magnesium halide (e.g., magnesium chloride) or an organomagnesium compound, and in an aspect, the second catalyst can be formed by contacting a titanium compound with an organomagnesium compound. For example, the titanium compound can be TiCl$_4$ (titanium tetrachloride) and the organomagnesium compound can be an alkyl magnesium compound such as ethyl magnesium chloride or dibutyl magnesium. In one aspect the alkyl magnesium compound can be an alkyl magnesium silylamide. Suitable alkyl magnesium silylamides for use in this process are described in U.S. Pat. No. 4,499,198, which is incorporated herein by reference. Other suitable magnesium-titanium based Ziegler-Natta catalysts are described in U.S. Pat. Nos. 3,989,881; 4,303,771; 4,707, 530; 5,300,470; and 5,589,555, which are incorporated herein by reference.

In this optional mode of operating a multi-reactor configuration, in which a magnesium-titanium based Ziegler-Natta catalyst is used, an aluminum compound can be added as a co-catalyst to the second reactor, which can be TNOAL as used in the first parallel reactor, or it can be a different aluminum compound than that added to the first parallel reactor. When using TNOAL, the higher initial homopolymer density provided by using TNOAL co-catalyst allows for increased octene incorporation in order to achieve the same high-density polyethylene (HDPE) co-polymer density, which allows for a tunable polymer density for achieving, e.g. the desired material stiffness. The molar ratio of the aluminum compound to the titanium compound can be the same as the molar ratio of the aluminum compound to the combined titanium and vanadium compounds in the first reactor. Alternatively, the molar ratio of the aluminum compound to titanium can be within the range of 30:1 to 1:30, or from 10:1 to 1:10, or from 1:1 to 5:1. If desired, other aluminum compounds can be added to the second parallel reactor such as trialkyl aluminum compounds such as triethyl aluminum or tri-isobutyl aluminum, a dialkyl aluminum halide such as diethyl aluminum chloride, an alkyl aluminum dihalide such as butyl aluminum dichloride, a dialkyl aluminum alkoxide such as diethyl aluminum ethoxide, a dialkyl aluminum siloxide such as dibutyl aluminum trimethyl siloxide, or a tetraalkyl aluminum oxide such as bis(di-isobutylaluminum)oxide.

In a multi-reactor system of the present disclosure, the temperature and other reaction conditions of the second parallel reactor can be the same as that of the first parallel reactor. In the optional mode of operating a multi-reactor configuration, in which a magnesium-titanium based Ziegler-Natta catalyst is used, the temperature of the second parallel reactor can be lower than that of the first parallel reactor. For example, the temperature of the second parallel reactor can be from 140° C. to 220° C., or from 140° C. to 200° C. In one aspect, the temperature in the second parallel reactor can be at least 2° C. less or at least 5° C. less than the temperature of the first parallel reactor. It has been found that reducing the temperature in the second parallel reactor with the magnesium-titanium catalyst may lead to an increase in catalyst activity, which is different than many catalytic polymerization processes.

The product from each of the parallel reactors can be fed to a second reaction zone (also called "Zone 2"). Optionally, ethylene, an α-olefin comonomer, hydrogen, and a catalyst are also fed to Zone 2. In one aspect, all of the α-olefin comonomer can be added in Zone 1 and none can be added to Zone 2 (or any subsequent reaction zones). In some embodiments, the olefin composition comprising ethylene and the same catalyst as used in one or both of the first and second parallel reactors also can be added to Zone 2. In further embodiments, the temperature of Zone 2 is higher than the temperature of the first parallel reactor (in Zone 1), for example, the temperature of Zone 2 can be from 150° C. to 320° C. or from 170° C. to 280° C. Zone 2 can include one reactor, or more than one reactor, but in one aspect, a single reactor can be used. Optionally, there can be more than two reaction zones, in which the temperature of each subsequent reaction zone can be higher than that of the preceding zone. The reactors can comprise any suitable equipment such as combinations of continuous stirred tank reactors or tubular reactors.

Optionally, chain transfer agents can be added to one or more of the reactors to control molecular weight. Hydrogen can be used as a chain transfer agent, and the amount of hydrogen used in any reactor can be varied. When an optional α-olefin comonomer is used, greater than about 60% by weight of the α-olefin can be added to the second parallel reactor, and more hydrogen can be added to the first parallel reactor than to the second parallel reactor. By adjusting the hydrogen flow in this manner, comonomer can be incorporated into the high molecular weight portion of the overall molecular weight distribution.

Aspects of the disclosure are further illustrated by means of the following examples, which are not intended to be construed in any way as imposing limitations upon the scope thereof. Various other aspects, embodiments, modifications, and equivalents thereof may be encompassed by the disclosure without departing from the spirit of the present disclosure or the scope of the appended claims.

Example 1. Initial Co-Catalyst Tests for Propensity to Form Oligomers at High Temperatures A 4-liter reactor is purged with nitrogen ($N_2$) gas to reduce impurities, and 1200 mL of Isopar™ H solvent is added. Hydrogen was added from a 75 ml addition vessel and accompanied by a 400 psig pressure drop. The reactor pressure was 550 psig. The reactor was then brought to 210° C. and the co-catalyst under test was injected. Upon injection of co-catalyst, a temperature rise was noted throughout the run, and was ethylene fed upon demand at 550 psi pressure.

After 20 minutes run time, the reaction was terminated by turning off the ethylene and rapidly discharging the reactor contents to a dump vessel. The contents of the dump vessel were cooled and collected by filtration. About 2-4 grams of solid material were collected. The ethylene mass flow meter indicated that between 10-30 grams of ethylene had been consumed, which would have been present in the reaction solvent. The co-catalyst runs in this example were conducted with $1 \times 10^{-2}$ moles of co-catalyst. FIG. 1 summarizes the results of the co-catalyst only tests. In FIG. 1, results are shown for co-catalysts selected from TEAL (triethyl aluminum), TIBAO (triisobutyl aluminoxane, alternatively known as isobutyl aluminoxane), TNOAL (tri-n-octyl aluminum), or DEALE (diethyl aluminum ethoxide). Two runs using TEAL co-catalyst are shown in FIG. 1.

The data of FIG. 1 demonstrate that TNOAL co-catalyst consumes the least amount of ethylene of all the co-catalysts tested, and much less than the total ethylene consumed using TEAL. FIG. 1 also shows that TIBAO and DEALE co-catalyst runs generated less oligomers than the TEAL co-catalyst system under the same conditions.

Example 2. Co-Polymerization Experiments with 1-Octene Using Vanadium Halide/Titanium Halide Catalyst System and Different Co-Catalysts Polymerization experiments were conducted at 140° C. using a $4VOCl_3/TiCl_4$ catalyst combination, that is, vanadium oxytrichloride in combination with titanium tetrachloride, in a molar ratio of 4 moles (V) to 1 mole (Ti). The polymerization experiments were carried out in the same reactor as the oligomerization experiments described in Example 1. The co-catalyst is injected into the reactor and allowed to stir for 30 seconds, then the catalyst solution is added. The polymerization time starts when the catalyst is added and ends when the ethylene is shut off and the reactor is dumped to the discharge vessel. The following Table provides the polymerization test conditions, with reaction time for each experiment being 60 seconds, and properties of the resulting polymer.

TABLE 1

| Ex. No. | Catalyst | Cat cc | Cocat | Cocat cc | C2= Pressure | Run T (°C.) | Vol. Isopar H (cc) | Vol. C8= (cc) | $H_2$, $\Delta P$ small vessel 75 cc | Run Time (sec) | Mileage (gPE/g CAT) | MI | HLMI/ MI |
|---|---|---|---|---|---|---|---|---|---|---|---|---|---|
| 2A | V Ti | 0.6 | TEAL | 2.0 | 300 | 140 | 800 | 600 | 400 | 60 | 1019 | 4.85 | 46.0 |
| 2B | V Ti | 0.6 | TEAL | 2.0 | 300 | 140 | 800 | 600 | 400 | 60 | 1276 | 7.7 | 40.1 |
| 2C | V Ti | 0.6 | TNOA | 2.0 | 300 | 140 | 800 | 600 | 400 | 60 | 1363 | 9.45 | 41.0 |
| 2D | V Ti | 0.6 | TNOA | 2.0 | 300 | 140 | 800 | 600 | 400 | 60 | 1181 | 11.6 | 40.5 |
| Avg. TEAL | | | | | | | | | | | 1148 | 6.3 | 43.1 |
| Avg. TNOAL | | | | | | | | | | | 1272 | 10.5 | 40.8 |

In this chart, the ethylene ($C_2$) pressure is reported in psi, and the $H_2$ column reports the change in $H_2$ pressure also in psi, that is the change in pressure ($\Delta P$) from a 75 mL vessel. The vanadium and titanium catalyst is 4 moles of $VOCl_3$ combined with 1 mole of $TiCl_4$. The following solution parameters and components were used for the co-polymerization experiments:

0.6 mL V/Ti catalyst solution=$7.9 \times 10^{-1}$ moles (total moles of V+Ti, in heptane solution)

2.0 mL TEAL=$1.4 \times 10^1$ moles (solution in heptane)

2.0 mL TNOAL=$1.4 \times 10^1$ moles (solution in heptane)

Al/(V+Ti) molar ratio=1.75

As the data from Table 1 illustrate, the TNOAL co-catalyst runs yielded a higher catalyst mileage (grams polyethylene (PE)/gram catalyst) than the TEAL co-catalyst system, while providing similar polymer properties. The TIBAO and DEALE co-catalyst runs (data not shown) generated less oligomers than the TEAL co-catalyst system (see FIG. 1), but exhibited lower catalyst mileage than the TNOAL co-catalyst runs.

Example 3. Homo-Polymerization Experiments Using Vanadium Halide/Titanium Halide Catalyst System and Different Co-Catalysts Polymerization experiments were conducted with ethylene monomer only, using $4VOCl_3/TiCl_4$ catalyst combination, that is, in a molar ratio of 4 moles (V) to 1 mole (Ti). The polymerization experiments were carried out in the same reactor as the oligomerization experiments described in Example 1 and co-polymerization tests of Example 2, but were conducted at a polymerization temperature of 240° C. The following Table sets out the polymerization test parameters and components and polymerization results, with the polymerization reaction time for each experiment being 10 minutes.

TABLE 2

| Ex. No. | Catalyst | Cat cc | Cocat | Cocat cc | C2= Pressure | Run T (°C.) | Vol. Isopar H (cc) | Vol. C8= (cc) | $H_2$, $\Delta P$ small vessel 75 cc | Run Time (sec) | Mileage (gPE/g CAT) | MI |
|---|---|---|---|---|---|---|---|---|---|---|---|---|
| 3A | V Ti | 1.5 | TEAL | 5.4 | 500 | 240 | 1200 | 0 | 100 | 600 | 475 | 5.41 |
| 3B | V Ti | 1.5 | TNOA | 5.7 | 500 | 240 | 1200 | 0 | 100 | 600 | 1444 | 12.69 |
| 3C | V Ti | 0.9 | TNOA | 3.4 | 500 | 240 | 1200 | 0 | 100 | 600 | 1680 | 12.68 |

The following solution parameters and components were used for the co-polymerization experiments:

1.5 ml V/Ti catalyst=$2.0 \times 10^{-1}$ moles (Total moles of V+Ti, in heptane solution)

5.4 ml TEAL=$3.7 \times 10^{-1}$ moles (solution in heptane)

2.0 ml TNOAL=$3.9 \times 10^{-1}$ moles (solution in heptane)

Al/(V+Ti) molar ratio=1.9-2

Figure 2:
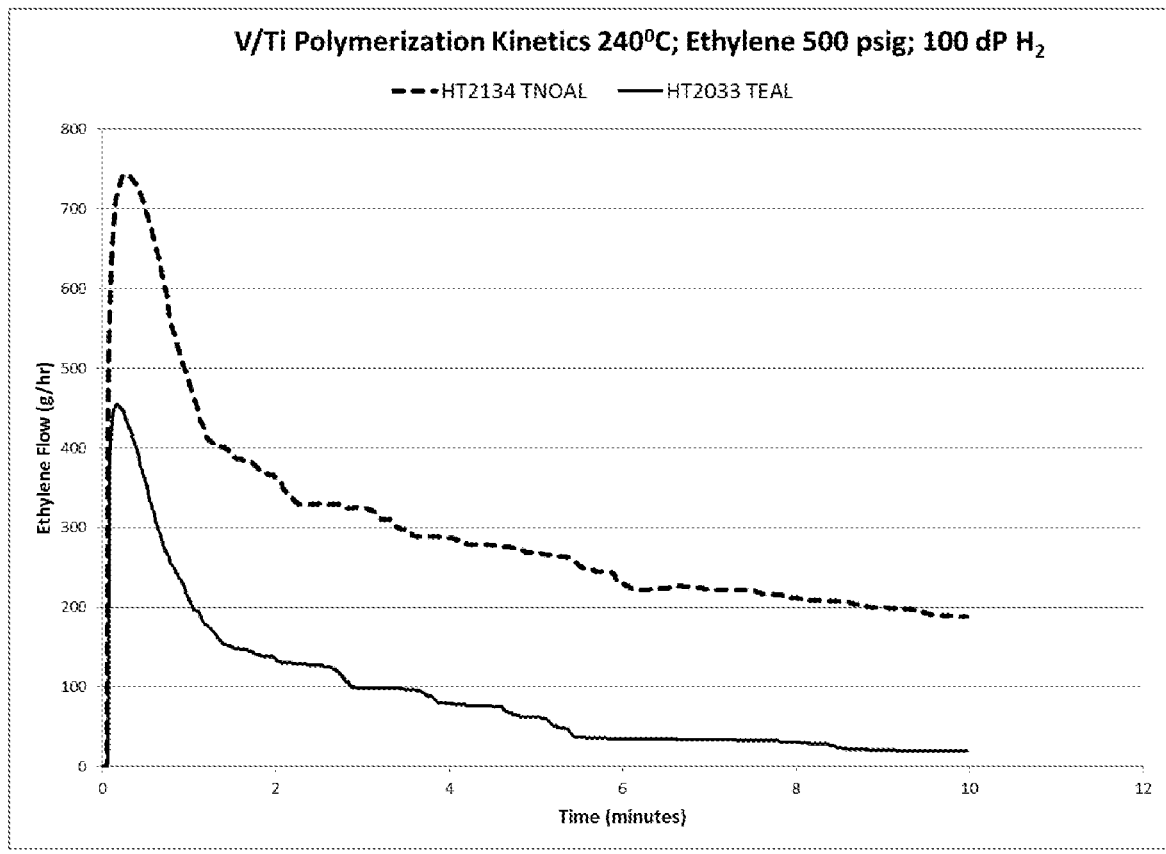
FIG. 2 depicts the polymerization kinetics of the experiments of Example 3.

The polymerization kinetics for the Example 3 runs are illustrated in FIG. 2. While TNOAL exhibits higher mileage as demonstrated by the dramatic difference in ethylene consumption between the TNOAL versus TEAL test runs, the TNOAL co-catalyst system exhibits similar decay kinetics.

The disclosures of various publications that may be referenced throughout this specification are hereby incorporated by reference in order to more fully describe the state of the art to which the disclosed subject matter pertains. To the extent that any definition or usage provided by any document incorporated herein by reference conflicts with the definition or usage provided herein, the definition or usage provided herein controls.

We claim:

1. A process for polymerizing olefins, the process comprising:
    a) contacting an olefin composition comprising ethylene with a catalyst system in a reactor, the catalyst system comprising a titanium halide, a vanadium halide, and tri-n-octyl aluminum co-catalyst; and
    b) forming a polyethylene under olefin polymerization conditions which provide a polyethylene homopolymer having a higher homopolymer density at equivalent homopolymer Melt Index (MI), as compared to a polyethylene homopolymer made under the olefin polymerization conditions with a reference catalyst system comprising the titanium halide, the vanadium halide, and triethyl aluminum co-catalyst wherein the polyethylene homopolymer has: (i) a melt index (MI) from 0.3 g/10 min to 100 g/10 min (ASTM D1238), (ii) a density of from 0.942 g/cm$^3$ to 0.970 g/cm$^3$, and (iii) a polydispersity index ($M_w/M_n$) of from 3-15.

2. The process of claim 1, wherein the olefin composition is absent an α-olefin co-monomer and the polyethylene is a polyethylene homopolymer.

3. The process of claim 1, wherein the titanium halide comprises titanium trichloride (TiCl$_3$) or titanium tetrachloride (TiCl$_4$), and wherein the vanadium halide comprises vanadium oxytrichloride (VOCl$_3$) or vanadium tetrachloride (VCl$_4$).

4. The process of claim 1, wherein the molar ratio of the tri-n-octyl aluminum co-catalyst to the combination of the titanium halide and the vanadium halide in the catalyst system is from 1:1 to 5:1.

5. The process of claim 1, wherein the molar ratio of the vanadium halide to the titanium halide in the catalyst system is from 0.5:1 to 10:1.

6. The process of claim 1, wherein the olefin polymerization conditions comprise a temperature of from 140° C. to 350° C.

7. The process of claim 1, wherein the olefin polymerization conditions comprise a pressure of from 0.5 MPa (4.9 atm) to 35 MPa (345 atm).

8. The process of claim 1, wherein the olefin composition further comprises a solvent comprising a C$_5$ to C$_{12}$ hydrocarbon compound.

9. The process of claim 1, wherein the process further comprises combining the titanium halide and the vanadium halide in a solvent to provide a transition metal catalyst mixture, followed by adding the tri-n-octyl aluminum co-catalyst to the transition metal catalyst mixture to provide the catalyst system.

10. The process of claim 1, wherein the process further comprises adding the titanium halide and the vanadium halide to the olefin composition in the reactor separately from adding the tri-n-octyl aluminum co-catalyst to the olefin composition in the reactor.

11. The process of claim 1, wherein the process has a catalyst mileage (g polyethylene (PE)/g catalyst) that is at least 20% greater than a catalyst mileage (g PE/g catalyst) of a conventional triethyl aluminum (TEAL) co-catalyst system, and the process produces a recycle stream having a concentration of butene that is at least 50% less than a concentration of butene in a recycle stream of a conventional TEAL co-catalyst system.

12. A multi-reactor solution polymerization process, the process comprising:
  a) in a first reaction zone, contacting a first olefin composition comprising ethylene with a first catalyst system in a first parallel reactor under first olefin polymerization conditions, and forming a first polyethylene;
  b) in the first reaction zone, contacting a second olefin composition comprising ethylene with a second catalyst system in a second parallel reactor under second olefin polymerization conditions, and forming a second polyethylene;
  c) transferring the first polyethylene and the second polyethylene from the first reaction zone to a second reaction zone to continue or complete the polymerization;
  wherein one or both of the first catalyst system and the second catalyst system comprise(s) a titanium halide, a vanadium halide, and tri-n-octyl aluminum co-catalyst; and
  wherein one or both of the first olefin polymerization conditions and the second olefin polymerization conditions provide a polyethylene homopolymer having a higher homopolymer density at equivalent homopolymer Melt Index (MI), as compared to a polyethylene homopolymer made under the olefin polymerization conditions with a reference catalyst system comprising the titanium halide, the vanadium halide, and triethyl aluminum co-catalyst
  wherein one or both of the first polyethylene and the second polyethylene has (i) a melt index (MI) from 0.3 g/10 min to 100 g/10 min (ASTM D1238), (ii) a density of from 0.942 g/cm$^3$ to 0.970 g/cm$^3$, or (iii) a polydispersity index ($M_w/M_n$) of from 3-15.

13. The process of claim 12, wherein the molar ratio of the tri-n-octyl aluminum co-catalyst to the combination of the titanium halide and the vanadium halide in one or both of the first catalyst system and the second catalyst system is from 1:1 to 5:1.

14. The process of claim 12, wherein the molar ratio of the vanadium halide to the titanium halide in one or both of the first catalyst system and the second catalyst system is from 0.5:1 to 10:1.

15. The process of claim 12, wherein one or both of the first olefin polymerization conditions and the second polymerization conditions comprise: [a] a temperature of from 140° C. to 350° C.; or [b] a pressure of from 0.5 MPa (4.9 atm) to 35 MPa (345 atm).

16. The process of claim 12, wherein one or both of the first polyethylene and the second polyethylene has a polydispersity index ($M_w/M_n$) of from 3 to less than 6.

17. The process of claim 12, wherein the second catalyst system comprises the contact product of a titanium halide and a magnesium halide or an organomagnesium compound, and wherein the temperature in the second parallel reactor is lower than the temperature in the first parallel reactor.

18. The process of claim 12, wherein the first parallel reactor and the second parallel reactor are operated under the same conditions.

19. The process of claim 1, wherein the polyethylene homopolymer has:
  (i) a melt index (MI) from 1.5 g/10 min to 100 g/10 min (ASTM D1238).

* * * * *